Figure 1:
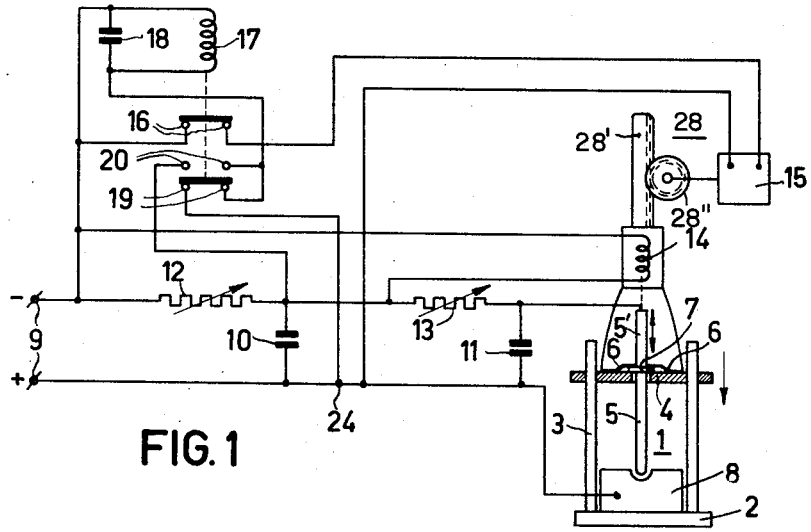

July 31, 1962 H. E. DE BRUYN 3,047,707
DEVICE FOR WORKING METALS
Filed June 17, 1960

INVENTOR
Hendrik E. de Bruijn
BY
Frank R. Trifari
AGENT

United States Patent Office 3,047,707
Patented July 31, 1962

3,047,707
DEVICE FOR WORKING METALS
Hendrik Elias de Bruyn, Eindhoven, Netherlands, assignor to North American Philips Company, Inc., New York, N.Y., a corporation of Delaware
Filed June 17, 1960, Ser. No. 36,990
Claims priority, application Netherlands July 1, 1959
11 Claims. (Cl. 219—69)

This invention relates to a device for working metals, i.e. conductive work pieces, by spark discharge erosion, known, for example, such as the device described in British patent specification No. 800,061, for working metals by spark discharge erosion, in which an electrode holder is controlled by an electro-magnetic member. The electrode holder is resiliently suspended in a guide member which is displaceable along a support. The winding of the electro-magnetic member is actuated by a source of pulses and the electrode holder, which has associated therewith a ferromagnetic armature means to coact with the winding of the electro-magnetic member, is attracted upwards during the application or presence of each pulse and is returned by gravitational means during the absence of a pulse, i.e. in the intervals between consecutively applied pulses. A constant source of potential is applied between the electrode and the work piece, so that each time the electrode is moved upwardly away from the work piece a spark occurs therebetween and thus spark erodes, i.e. removes particles from the work piece in a manner well known to those skilled in the art. As more and more particles are removed, the electrode penetrates to a greater depth into the work piece, and it becomes necessary to reposition the guide member together with the electro-magnetic member along the support towards the work piece in order to maintain a sufficient gap therebetween to provide and/or maintain proper spark discharging. It has been found that in operating the prior art devices, such as the one described in the aforementioned British patent specification, the repositioning of the guide means and/or the vibrations produced by the reciprocating action described above are detrimental to the operation of the device, as well as, the work piece worked thereby. For example, movement of the guide means by mechanical means or by independent automatic means requires the interruption of the spark discharge operation, which increases the overall operational time of the device. The reciprocating action of the electrode during the spark discharge operation, also, increases the overall operational time. Both of these operations are not conducive to the production of work pieces having close tolerances due to the difficulty when, for example, repositioning is required in aligning accurately the electrode with respect to the center of the work piece area being worked, and/or the difficulty of maintaining the electrode with respect to this center due to the aforementioned vibrations induced in the electrode and/or guide means.

Thus, an object of this invention is to provide a device of the class described having a reduced overall operational time.

Another object of this invention is to provide a device of the class described which can provide closer tolerances in the work pieces processed thereby.

Accordingly, this invention broadly features a device for working a conductive work piece by application of spark discharges to spark-erode particles therefrom which comprises, inter alia, an electrode, capacitive energy storage means coupled to the electrode and the work piece, and circuit charging means coupled to the energy storage means to charge the energy storage means. Means are provided for discharging the energy storage means through the electrode and the work piece to provide the spark discharges and comprises means to position the electrode relative to the work piece, first means which are responsive to the energy level of the storage means to actuate and adjust the positioning means to provide a relative spacing between the electrode and the work piece sufficient to maintain a spark discharge therebetween, and second means responsive to the energy level of the storage means to move the electrode with respect to the work piece in order to maintain a uniform gap therebetween and, thereby, compensate for increases in the gap caused by the removal of the spark-eroded particles from the work piece. The energy level of the storage means is dependent on the spacing and/or gap between the electrode and the work piece and, thus, the device of the invention is provided with automatic positioning means which in response to the energy level of the storage means detects whether or not the position of the electrode relative to the work piece is sufficient to provide spark discharges therebetween, and, if not, positions the electrode with respect to the work piece to be in condition to do so. In addition, as the spark discharging is occurring, the electrode is automatically moved with respect to the work piece to maintain a uniform gap therebetween in response to the level of the energy means. Because of this feature, in conjunction with the manner utilized to charge the storage means, the electrode is moved with respect to the work piece in a unidirectional motion and obviates the reciprocating motion required in the above described prior art devices and its deleterious effects, as aforementioned.

Utilizing, as an example, the device of the aforementioned British application to teach the principles of the invention, the electro-magnetic member thereof is energized with an electric magnitude proportional to the distance between the electrode and work piece so that against the action of the resilient suspension the electrode in the guide member is unidirectionally moved towards the work piece in a space at which spark discharge erosion takes place. The electrode continues to advance in this manner and within this space until, such as, for example, when the movement of the electrode is arrested by the lug coming to rest on the guide member. However, at this limit the spark discharge erosion continues and, as well as, the consequent particle removal until the gap between the electrode and the work piece becomes too large to accommodate further break down and discharge therebetween. In this regard, provision is made of a separate member which responds to a deviation from the aforesaid electric magnitude such that this member produces a vibration-free movement of the guide member which moves or maintains the electrode in the control-range of the electro-magnetic device and to a position relative to the work piece where spark discharge erosion takes place.

The distance between the electrode and the work piece is a measure of the mean electrode current or the voltage between the electrode and the work piece (the said electric magnitude) and is thus dependent upon the energy level of an energy storage means which is connected across them. Thus, not only is the electro-magnetic device, alone or in combination with the resilient suspension of the electrode holder made responsive to the energy of the energy storage means to adjust the ever increasing gap caused by the particle removal but also the separate driving member of the guide member is similarly made dependent on the energy level of the storage means to position the electrode properly as described hereinabove. The working distance may therefore vary slightly, as long as it remains substantially within the limits within which effective spark erosion can take place. The resilient suspension may be considered as a fine control, the separate member as a coarse control, so that the separate member need not operate with the same accuracy and precision instruments may therefore be dispensed with. The fine control corrects or adjusts the electrode position more accurately with respect to the work piece while the coarse control functions to position the electrode in the general vicinity of the portion of the work piece to be worked in which an effective spark discharge can occur.

The electric magnitude for driving the separate member may be supplied either continuously or by way of a pulse, for example, with intervals of 3 secs., so that approximately every three seconds a displacement takes place. In both cases spark erosion can take place by a discharge with a high frequency of, for example, 1000 to 10,000 c./s., which value is only approximately 100 c./s. in the device of the aforementioned British patent specification when operating in the mode described therein. The working rate can thus be five to fifty times higher.

Owing to the vibration-free movement of the guide member, which may be driven, by means of an electric motor or a hydraulic device, the tendency of the resiliently suspended electrode to vibrate is mitigated and/or obviated, which results in a greater accuracy in working the work piece.

The working distance between the electrodes and the work piece will, in general, vary between about 0.01 and 0.05 mm.

Figure 2:
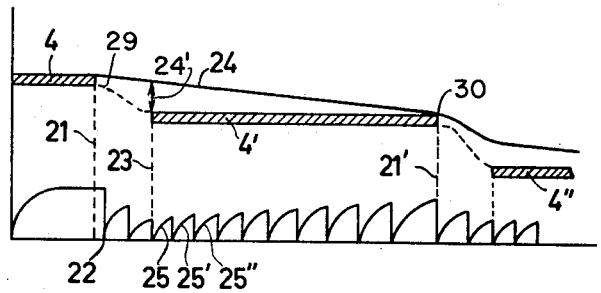
Figure 3:
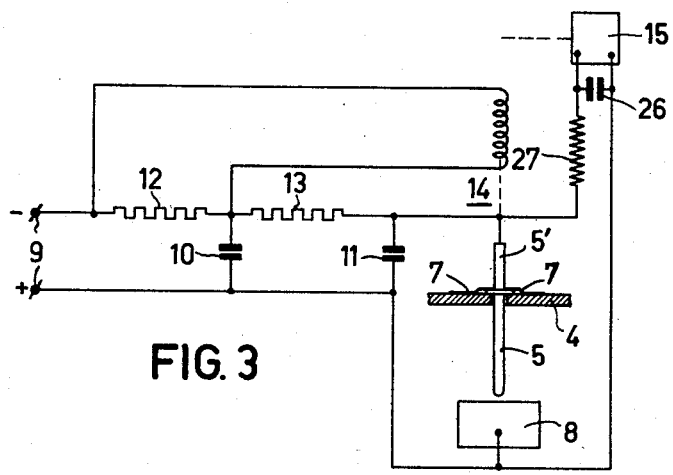

The above-mentioned and other features and objects of this invention will become more apparent by reference to the following description taken in conjunction with the accompanying drawings, in which:

FIG. 1 is a view, in diagrammatic and circuit schematic form, which illustrates one embodiment of the device of the invention, FIG. 2 is displacement and voltage waveforms helpful in explaining the operation of the device of FIG. 1, and FIG. 3 is a view, in diagrammatic and circuit schematic form, which illustrates another embodiment of the device of this invention.

As shown in FIG. 1, the device 1 comprises a base plate 2 with a support consisting of two columns 3, on which a guide member 4 is movably arranged. An electrode 5 is located in an electrode holder 5', the latter having, for example, a ferromagnetic core or member associated therewith functioning as the armature of an electro-magnetic device 14, whose coil is carried on the rack 28' of the rack and gear assembly 28. The gear 28" is adapted to be driven by the motor 15, in a manner well known to those skilled in the art. The electrode holder 5' is connected with the guide member 4 by means of a lug 7 and blade springs 6 as, for example, by affixing one of the ends of each blade spring 6 to the top of the member 4 and affixing the other end of each blade spring 6 to the top of the lug 7. Thus, in the rest position, the lug 7 can bear on the member 4 or the lug can be held by the springs 6 at a short distance from the member 4. Below the electrode 5 is located the work piece 8. The other elements of the invention will be described in conjunction with the operational description hereinafter. It suffices to say, however, that the relay 17 in the arrangement is shown in the de-energized state and operates with a delayed armature response and, as well as, a delayed armature release.

The device operates as follows: it will be assumed, for the sake of explanation, that the guide member in the starting position is shifted to such a height that the electrode 5 is free of the work piece 8.

When a direct-voltage source is connected to the terminals 9, the capacitors 10 and 11 are charged via the resistors 12 and 13 and after which, due to the absence of a charging current through resistor 12 no voltage is developed across the coil of the electro-magnetic device 14. The electro-magnetic device 14 for controlling the electrode holder 5', together with the member 4 (to which it is linked) is, driven by coaction of the rack and gear assembly 28 and motor 15, the latter being energized from the voltage source via the contacts 16 of the relay 17 and a delay capacitor 18, which is utilized to delay the release of the relay armature, in a direction towards the work piece.

When the armature of the relay 17, which, as previously mentioned, is operating with a responsive delay, is attracted by the relay winding, the contacts 16 and 19 are interrupted and the contacts 20 are closed. This causes the relay winding to be removed from across the terminals 9 and shunted instead across resistor 12 and, in addition, the motor to be de-energized and, thus, the shaft rotation of the motor 15 is arrested. The relative position of the electrode 5 with respect to the work piece 8 determines the further operational activity of the apparatus of the arrangement. If the electrode 5 has not yet reached the work piece 8 so as to be able to discharge the capacitor 11, the armature of the relay 17 is released after a short time which is determined by the time required for the delay capacitor 18 to discharge, inter alia, through the coil winding of relay 17. Thus, under these conditions and with contact 20 closed, since there is no discharge of capacitor 11, the coil winding of relay 17 remains de-energized after capacitor 18 is discharged due to the absence of a voltage drop across resistor 12 and thus causes the releasement of the relay armature and the contacts 16 and 19 are again closed, in which case the cycle is repeated until the electrode 5 has sufficiently approached the work piece 8 to allow a discharge of capacitor 11 through electrode 5 and the work piece 8.

If or when the distance between the electrode 5 and the work piece 8 has become so small that an effective discharge of the capacitor 11 via the electrode 5 and the work piece 8 occurs, by judiciously selecting the magnitudes of the circuit parameters involved, a charging current begins to flow through the resistor 12 which develops a voltage drop across it sufficient for the relay 17 to remain in the energized state via the contacts 20. The voltage drop across the resistor 12 also occurs across the coil of the electro-magnetic member 14 with the result that a current passes through and energizes the coil of member 14 attracting the armature thereof which is associated with the electrode 5. Thus, electrode 5 is pulled upwards over a small distance, so that the distance between the lug 7 and the guide member 4 increases and a given distance is obtained between the electrode and the work piece. Across this gap the capacitor 11, which has in the meantime been partly recharged, is discharged and then charged via the resistor 13, and so on, with the discharges preferably taking place at a high frequency. As the particles of the work piece at each discharge, are eroded, the gap between the electrode and the work piece increases. As a result, the capacitor 11 is charged each time to a higher voltage before the next successive discharge occurs due to the increasingly longer periods required to ionize the gaps which is successively increasing, as will be apparent hereinafter. However, the mean electrode current passing through the resistor 12 is caused, via the provision of a suitable smoothing network, to decrease slightly. For this purpose, the capacitor 10, which has a high capacity as compared with the capacitor 11 (for example, 500 μF to 1 μF), serves as a smoothing capacitor for the voltage at the resistor 12. Thus, the voltage drop across the resistor 12 decreases uniformly, causing the current passing through the coil of member 14 to decrease in the same manner. As a result the armature of member 14 and, consequently, the electrode 5 moves uniformly downwards slowly in a unidirectional manner and the gap is kept substantially constant and increases only very slowly. After a short time period, for example, 3 seconds, when the electrode has been lowered to an extent such that it cannot drop any further due, for example, to the counteraction of the blade springs 6 or due to the lug stopping at the member 4, the continued spark erosion causes the gap to increase continually. As a result the mean electrode current across the resistor 12 also decreases and the armature of the relay 17 is released opening the contacts 20 and closing the contacts 16 and 19. Thus the motor 15 is re-energized for a moment, the relay 17 is energized, the contacts 16 and 19 are again opened and the contacts 20 are again closed, and another vibration-free displacement of the member 4 takes place. The spark discharge erosion part of the cycle is then repeated.

The operation is shown diagrammatically in FIG. 2 in which the abscissa axis represents relatively the time period incurred in a typical operation of the device of FIG. 1, and the uppermost portion of the ordinate axis represents the relative spatial displacement between the work piece 8 and the member 4 incurred by the latter during such time period, and the lower portion represents the relative voltage output of the capacitor 11 during this same time period.

At the instant 21, FIG. 2, it is assumed the guide member 4 has arrived at the position shown. The capacitor 11 has been charged, but it cannot yet discharge, however, because it will be assumed that the spacing between the work piece 8 and the electrode 5 for the particular voltage across capacitor 11 is insufficient to cause ionization and breakdown therebetween. As described above, one or more further vibration-free displacements of the member 4 occur and the displacements are represented by the broken line 29 shown in the upper part of FIG. 2, until, for example, at the instant 22, a discharge takes place. The member 4 is displaced at this time, it is assumed, into the position 4'. During the displacement, a number of charging and discharging actions may take place, for example, twice, as is illustrated in FIG. 2, before the action of the electro-magnetic member 14 begins to control the movement of the electrode 5. For example, the member 4, may position the electrode 5 with respect to the work piece 8 at a distance just sufficient to cause a single discharge, but when the electrode 5 is retracted by the member 14, the increased spacing due to the retraction may be insufficient to cause a discharge through the gap and, consequently, the control by the member 14 of the electrode 5 would be prevented and the member 4 repositioned. It will be assumed, however, that in the position 4', at the instant 23, the spacing between the work piece 8 and the electrode 5 is such that the electro-magnetic member 14 controls the action of the electrode 5 and thereafter, the capacitor 11 is repeatedly charged and discharged. The mean electrode current initially attracts the electrode 5 upwards at a height 24' above the position 4', and the electrode 5 is thereafter, as aforementioned, uniformly moved towards the work piece 8 in a unidirectional manner, as is indicated by the line 24. The capacitor 11 is charged and discharged a great many times, as is indicated by the curves 25, 25', 25" and so on. It is to be understood that the voltage waveform illustrated in FIG. 2 has been greatly enlarged for the sake of clarity, and that actually a great number of pulses are or can take place between the period 21—21' than those illustrated therein. The amplitude level of the capacitor voltage depends upon the spacing between the work piece 8 and electrode 5. As the material of the work piece commences to be removed by the spark produced by the discharge of capacitor 11, at the commencement and during most of the cycle of member 14, the voltage across capacitor 11 will build up after each discharge to substantially the same level because of the ability of the electromagnet member 14 to keep the electrode 5 moving toward work piece 8 so as to maintain the uniform gap between them. In this manner the member 14 compensates for the increase in the gap caused by the removal of the material by prior discharges. However, at or near the end of this cycle, when the electrode can no longer be advanced uniformly toward the work piece 8 or is stopped, the gap will commence to grow after each discharge causing the voltage to build up to successively larger amplitudes until such time that the gap becomes so large that ionization and associated discharge between the work piece 8 and electrode 5 cannot be effectuated by the potential level of the capacitor and at which time the capacitor voltage will attain its steady state level, if not sooner discharged by movement of the guide member 4 via motor 5. Thus as the current in the resistor 12 decreases, the electrode drops slowly as indicated by the line 24 to the lowermost point 30. Owing to the decrease in the mean electrode current due to an increase in charging time of the capacitor 11, the armature of relay 17 finally is released and the supply voltage is again supplied to the motor 15, so that a new displacement takes place at the instant 21', and the cycle is repeated. The time duration between 21 and 21' may, for example, be 3 seconds and depends, for example, on the characteristics of the machine, the material of the work piece, the size of the electrode section, and so forth, while the frequency of sparks in discharge path may, for example, be 20,000 cps.

FIG. 3 illustrates an embodiment of this invention similar to that described in FIG. 1, but modified to allow the guide member 4 to be continually driven. For the sake of simplicity, only a few parts of the device of FIG. 3 are illustrated and reference number of similar elements thereof are identical to those of the device shown in FIG. 1. The motor 15 of the embodiment of FIG. 3 is connected, however, to the voltage between the electrode 5 and the work piece 8, which voltage is smoothed by the resistor 27 and the capacitor 26.

If spark erosion has not commenced, the motor rotates at the full voltage and displaces the guide member 4 slowly towards the work piece.

As soon as spark erosion takes place, the voltage between the electrode 5 and the work piece 8 decreases, which decreases the speed or number of revolutions of the motor 15. Due to the mean electrode current the resistor 12 has developed a voltage drop across it. As a consequence, the electrode holder is pulled upwards against the tension of the springs 6 due to the presence of an energizing current in the coil of the member 14. As soon as the gap between electrode 5 and work piece 8 becomes larger, the mean electrode current across 12 decreases and the electrode holder moves slowly downwards.

The voltage to which the capacitor 11 is charged also increases and hence the voltage at the capacitor 26 and the number of revolutions of the motor 15 will increase as well. By judiciously selecting the speed versus input voltage characteristic of motor 15, the guide means 4 driven thereby continually positions the electrode 5, with respect to the work piece 8 at the proper spacing. This results in the width of the gap being continually corrected.

The effect of the motor 15 and guide means 4 is to maintain the width of the gap constant and preferably at the optimum spacing required for effective discharging. However, the motor 15 need not fulfill severe requirements with respect to accuracy and inertia in the fine control and/or correction required to position the electrode 5 with respect to the work piece 8 as the spark discharges are taking place, since the electro-magnetic member 14 supported on the guide member provides this correction.

Other modifications will be apparent to those skilled in the art in the operation and/or structure of the device without departing from the scope of the present invention, as for example, the motor 15 may be energized with a constant direct-current energization in conjunction with an opposite energization proportional to the decreasing voltage across the resistor 12. If this voltage becomes too low, the number of revolutions of the motor is increased correspondingly to compensate for the increase in the gap width in a similar manner described hereinabove.

When using a hydraulic drive of the member 4, a second electro-magnetic device may be used to control a valve of the hydraulic member so that the movement of the member 4 is delayed at an increasing current through the electro-magnetic device. The two devices, shunted by capacitors, are connected in series with the discharge circuit. At an increasing gap between the electrode and the work piece the mean electrode current will decrease and hence:

(1) The valve will be opened further, so that the movement of the guide member towards the work piece is accelerated,
(2) The electrode is moved upwardly with respect to the guide member to an extent such that the gap between the work piece and the electrode is again enlarged.

In both cases the effect is that the gap between the electrode and the work piece is kept approximately constant. The hydraulic device need not provide, however, an accurate control. The electro-magnetic device in the guide member provides the correction.

Thus, while I have described above the principles of my invention in connection with specific apparatus, it is to be clearly understood that this description is made by way of example only and not as a limitation to the scope of my invention as set forth in the objects thereof and in the accompanying claims.

I claim:

1. A device for working a conductive work piece by application of spark discharges to spark-erode particles therefrom, said device comprising an electrode, capacitive energy storage means coupled to said electrode and said work piece, circuit charging means coupled to said energy storage means to charge said energy storage means to an energy level dependent upon the distance between said electrode and said work piece, and means for discharging said energy storage means through said electrode and said work piece to provide said spark discharges, said means for discharging comprising means to position said electrode relative to said work piece, first means responsive to the energy level of said storage means to actuate and adjust said positioning means to provide a relative spacing between said electrode and said work piece sufficient to maintain a spark discharge therebetween, and second means responsive to the energy level of said storage means to move said electrode with respect to said work piece to maintain a uniform gap therebetween to compensate for increases in said gap caused by the removal of the spark-eroded particles from said work piece.

2. A device for working a conductive work piece by application of spark discharges to spark-erode particles therefrom, said device comprising an electrode, capacitive energy storage means coupled to said electrode and said work piece, circuit charging means coupled to said energy storage means to charge said energy storage means to an energy level dependent upon the distance between said electrode and said work piece, and means for discharging said energy storage means through said electrode and said work piece to provide said spark discharges, said means for discharging comprising means to position said electrode relative to said work piece, first electro-magnetic means responsive to the energy level of said storage means to actuate and adjust said positioning means to provide a relative spacing between said electrode and said work piece sufficient to maintain a spark discharge therebetween, and second electromagnetic means responsive to the energy level of said storage means to move said electrode with respect to said work piece to maintain a uniform gap therebetween to compensate for increases in said gap caused by the removal of the spark-eroded particles from said work piece.

3. A device according to claim 2 wherein said means to position comprises an electric motor controlled by said first electro-magnetic means and coupling means to connect said motor and said electrode to effectuate said positioning.

4. A device for working a conductive work piece by application of spark discharges to spark-erode particles therefrom, said device comprising an electrode, capacitive energy storage means coupled to said electrode and said work piece, circuit charging means coupled to said energy storage means to charge said energy storage means to an energy storage level dependent upon the distance between said electrode and said work piece, and means for discharging said energy storage means through said electrode and said work piece to provide said spark discharges, said means for discharging comprising means to position said electrode relative to said work piece, a smoothing circuit coupled to said storage means responsive to the energy level thereof to actuate and adjust said positioning means to provide a relative spacing between said electrode and said work piece sufficient to maintain a spark discharge therebetween, and electro-magnetic means responsive to the energy level of said storage means to move said electrode with respect to said work piece to maintain a uniform gap therebetween to compensate for increases in said gap caused by the removal of the spark-eroded particles from said work piece.

5. A device according to claim 4, wherein said first means intermittently actuates and adjusts said positioning means, the respective actions of said positioning means and said means to move occurring in mutually exclusive time periods.

6. A device according to claim 4, wherein said first means continuously actuates and adjusts said positioning means.

7. A device according to claim 4, wherein said means to position comprises an electric motor controlled by said smoothing circuit and means to connect said motor and said electrode to effectuate said positioning.

8. A device for working a conductive work piece by application of spark discharges to spark-erode particles therefrom, said device comprising an electrode, capacitive energy storage means coupled to said electrode, and said work piece, circuit charging means coupled to said energy storage means to charge said energy storage means to an energy level dependent upon the distance between said electrode and said work piece, and means for discharging said energy storage means through said electrode and said work piece to provide said spark discharges, said means for discharging comprising means to position said electrode relative to said work piece, first means responsive to the energy level of said storage means to actuate and adjust intermittently said positioning means to provide a relative spacing between said electrode and said work piece sufficient to maintain a spark discharge therebetween, and second means responsive to the energy level of said storage means to move said electrode with respect to said work piece to maintain a uniform gap therebetween to compensate for increases in said gap caused by the removal of the spark-eroded particles from said work piece, the respective actions of said positioning means and said means to move occurring in mutually exclusive time periods.

9. A device for working a conductive work piece by application of spark discharges to spark-erode particles therefrom, said device comprising an electrode, capacitive energy storage means coupled to said electrode and said work piece, circuit charging means coupled to said energy storage means to charge said energy storage means to an energy level dependent upon the distance between said electrode and said work piece, and means for discharging said energy storage means through said electrode and said work piece to provide said spark discharges, said means for discharging comprising means to position said electrode relative to said work piece, first means responsive to the energy level of said storage means to actuate and adjust continuously said positioning means to provide a relative spacing between said electrode and said work piece sufficient to maintain a spark discharge therebetween, and second means responsive to the energy level of said storage means to move said electrode with respect to said work piece to maintain a uniform gap therebetween to compensate for increases in said gap caused by the removal of the spark-eroded particles from said work piece.

10. A device for working a conductive work piece by application of spark discharges to spark-erode particles therefrom, said device comprising an electrode, capacitive energy storage means coupled to said electrode and said work piece, circuit charging means coupled to said energy storage means to charge said energy storage means to an energy level dependent upon the distance between said electrode and said work piece, and means for discharging said energy storage means through said electrode and said work piece to provide said spark discharges, said means for discharging comprising means to position said electrode relative to said work piece, first electro-magnetic means responsive to the energy level of said storage means to actuate and adjust intermittently said positioning means to provide a relative spacing between said electrode and said work piece sufficient to maintain a spark discharge therebetween, and second electro-magnetic means responsive to the energy level of said storage means to move said electrode with respect to said work piece to maintain a uniform gap therebetween to compensate for increases in said gap caused by the removal of the spark-eroded particles from said work piece, the respective actions of said positioning means and said means to move occurring in mutually exclusive time periods.

11. A device for working a conductive work piece by application of spark discharges to spark-erode particles therefrom, said device comprising an electrode, capacitive energy storage means coupled to said electrode and said work piece, circuit charging means coupled to said energy storage means to charge said energy storage means to an energy level dependent upon the distance between said electrode and said work piece, and means for discharging said energy storage means through said electrode and said work piece to provide said spark discharges, said means for discharging comprising means to position said electrode relative to said work piece, first electro-magnetic means responsive to the energy condition of said storage means to actuate and adjust continuously said positioning means to provide a relative spacing between said electrode and said work piece sufficient to maintain a spark discharge therebetween, and second electro-magnetic means responsive to the energy level of said storage means to move said electrode with respect to said work piece to maintain a uniform gap therebetween to compensate for increases in said gap caused by the removal of the spark-eroded particles from said work piece.

References Cited in the file of this patent

UNITED STATES PATENTS

| | | |
|---|---|---|
| 2,762,946 | Manchester | Sept. 11, 1956 |
| 2,773,168 | Williams | Dec. 4, 1956 |
| 2,796,509 | Blake | June 18, 1957 |
| 2,807,706 | Oezer | Sept. 24, 1957 |
| 2,835,785 | Williams | May 20, 1958 |
| 2,882,437 | McKechnie | Apr. 14, 1959 |
| 2,903,555 | Porterfield | Sept. 8, 1959 |

FOREIGN PATENTS

| | | |
|---|---|---|
| 800,061 | Great Britain | Aug. 20, 1958 |